(12) United States Patent
White

(10) Patent No.: US 7,106,213 B2
(45) Date of Patent: Sep. 12, 2006

(54) DISTANCE DETECTION AND DISPLAY SYSTEM FOR USE IN A VEHICLE

(75) Inventor: Tommy E. White, Rochester Hills, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/281,880

(22) Filed: Oct. 28, 2002

(65) Prior Publication Data

US 2004/0080431 A1    Apr. 29, 2004

(51) Int. Cl.
*B60Q 1/48* (2006.01)
*G08G 1/14* (2006.01)

(52) U.S. Cl. .................. 340/932.2; 340/943; 362/494; 180/167; 180/169; 180/281; 359/838; 359/839

(58) Field of Classification Search ............. 340/932.2, 340/943, 903, 435; 180/281, 167, 169; 362/494; 359/838, 839
See application file for complete search history.

(56) References Cited

U.S. PATENT DOCUMENTS

| 4,674,073 | A |   | 6/1987 | Naruse ...................... 367/105 |
|---|---|---|---|---|
| 4,903,004 | A |   | 2/1990 | Starke et al. ............. 340/425.5 |
| 5,373,482 | A | * | 12/1994 | Gauthier ...................... 367/99 |
| 5,541,891 | A | * | 7/1996 | Waldmann et al. ............ 367/99 |
| 5,631,638 | A |   | 5/1997 | Kaspar et al. ............... 340/902 |
| 5,634,709 | A |   | 6/1997 | Iwama ....................... 362/83.1 |
| 5,670,935 | A | * | 9/1997 | Schofield et al. ........... 340/461 |
| 6,069,581 | A | * | 5/2000 | Bell et al. ...................... 342/70 |
| 6,099,154 | A |   | 8/2000 | Olney ......................... 362/494 |
| 6,106,121 | A | * | 8/2000 | Buckley et al. ............. 359/839 |
| 6,172,613 | B1 | * | 1/2001 | DeLine et al. ........... 340/815.4 |
| 6,268,803 | B1 | * | 7/2001 | Gunderson et al. ......... 340/903 |
| 6,281,786 | B1 | * | 8/2001 | Adachi et al. .............. 340/435 |
| 6,594,614 | B1 | * | 7/2003 | Studt et al. .................. 702/150 |
| 6,630,888 | B1 | * | 10/2003 | Lang et al. ............ 340/815.45 |
| 2003/0067383 | A1 | * | 4/2003 | Yang .......................... 340/435 |

FOREIGN PATENT DOCUMENTS

| JP | 62-36946 | 3/1987 |
|---|---|---|
| JP | 62-103751 | 7/1987 |
| JP | 4-25174 | 4/1992 |
| JP | 8-175263 | 7/1996 |
| JP | 9-240398 | 9/1997 |
| JP | 10-324209 | 12/1998 |
| JP | 2001-246996 | 9/2001 |

\* cited by examiner

*Primary Examiner*—Thomas J. Mullen, Jr.
*Assistant Examiner*—Samuel J Walk
(74) *Attorney, Agent, or Firm*—Laura C. Hargitt

(57) ABSTRACT

A distance measuring and display system for use on a vehicle having a mirror assembly thereon comprises at least one front distance measuring sensor for measuring the distance to an obstacle in front of the vehicle, at least one rear distance measuring sensor for measuring the distance to an obstacle to the rear of the vehicle, and a display coupled to the front distance measuring sensor and to the rear distance measuring sensor for displaying a distance and an indication of whether it is a front distance or a rear distance.

19 Claims, 3 Drawing Sheets

DISTANCE DETECTION AND DISPLAY SYSTEM FOR USE IN A VEHICLE

TECHNICAL FIELD

The present invention generally relates to vehicular collision avoidance systems, and more particularly to an apparatus for determining the distance between a vehicle and an obstacle in the path of the vehicle and for displaying that distance on a mirror mounted in or on the vehicle.

BACKGROUND OF THE INVENTION

In most circumstances, the operator of a vehicle such as an automobile, truck, and the like has adequate visibility for the safe operation of the vehicle. Furthermore, the operator's visibility is enhanced through the well known use of rearview and sideview mirrors. Despite this, however, there are situations when a driver's visibility is limited or eliminated entirely. For example, when a driver is maneuvering a vehicle into a parking space on the side of the road between two other vehicles, the driver is often required to perform one or more iterations of backing up and pulling forward between the two vehicles without contacting either vehicle. The driver, however, generally cannot see that portion of the driver's vehicle that might make such contact. In addition, difficulty is often encountered when the operator of a vehicle is pulling forward towards an obstacle such as when driving into a garage, and the driver has no line of sight to that region of the vehicle that will make contact with the obstacle. This is especially true when, for example, a truck is backing up to a loading dock for the purpose of unloading the truck's contents.

In an attempt to solve problems of this nature, vehicular collision avoidance systems have been developed and are now relatively common. Such systems may include an apparatus for determining the distance between a vehicle and an obstacle in the vehicle's path and apparatus for displaying that distance or at least alerting the operator of an impending collision. For example, U.S. Pat. No. 4,903,004 issued Feb. 20, 1990, and entitled "All-Weather Digital Distance Measuring and Signaling System" describes a distance measuring and signaling system for a vehicle specifically intended for accurately measuring distances from obstructions, such as those behind a truck as it is being backed up. An array of transducer devices having independent sending and receiving capabilities are mounted on a support frame, such as a rear bumper. A pulsed signal emanating from a transistor amplifier circuit is timed as it is converted to an ultrasonic wave signal by each transducer device, is simultaneously emitted and received by the transducer devices, and is returned as a pulsed signal. This signal is returned after bouncing back from an obstruction, and the time of the return is converted into a distance value by digital converter circuitry. The digital converter circuitry in turn sends the signal to a digital display device. U.S. Pat. No. 4,674,073 issued Jun. 16, 1987, and entitled "Reflective Object Detecting Apparatus" describes an apparatus wherein a plurality of ultrasonic transmitting elements and ultrasonic receiving elements are provided and are electrically switched in a sequential manner to allow the existence of an obstacle to be detected. The distance to the object and a particular region at which it is detected is displayed. The ultrasonic transmitting elements and the ultrasonic receiving elements are alternately disposed in a linear array.

Unfortunately, known systems of the type described above generally require the operator to divert his attention from performing functions critical to the safe operation of the vehicle in order to look at the display.

In view of the above, it would be desirable to provide a distance detection and display system which avoids the above described disadvantage by providing a distance display that is easily viewed by an operator of a vehicle so as not to distract the driver from more important driving operations.

SUMMARY OF THE INVENTION

A distance measuring and display system for use in a vehicle having a mirror assembly thereon comprises at least one front distance measuring sensor for measuring the distance to an obstacle in front of the vehicle, at least one rear distance measuring sensor for measuring the distance to an obstacle at the rear of the vehicle, and a display coupled to the front distance measuring sensor and to the rear distance measuring sensor for displaying a distance and an indication of whether it is a front distance or a rear distance.

BRIEF DESCRIPTION OF THE DRAWINGS

The following drawings are illustrative of particular embodiments of the invention and therefore do not limit the scope of the invention, but are presented to assist in providing a proper understanding of the invention. The drawings are not to scale (unless so stated) and are intended for use in conjunction with the explanations in the following detailed description. The present invention will hereinafter be described in conjunction with the appended drawing figures, wherein like numerals and like elements, and.

DESCRIPTION OF THE PREFERRED EMBODIMENT

The following description is exemplary in nature and is not intended to limit the scope, applicability, or configuration of the invention in any way. Rather, the following description provides a convenient illustration for implementing exemplary embodiments of the invention. Various changes to the described embodiments may be made in the function and arrangement of the elements described herein without departing from the scope of the invention.

Figure 1:
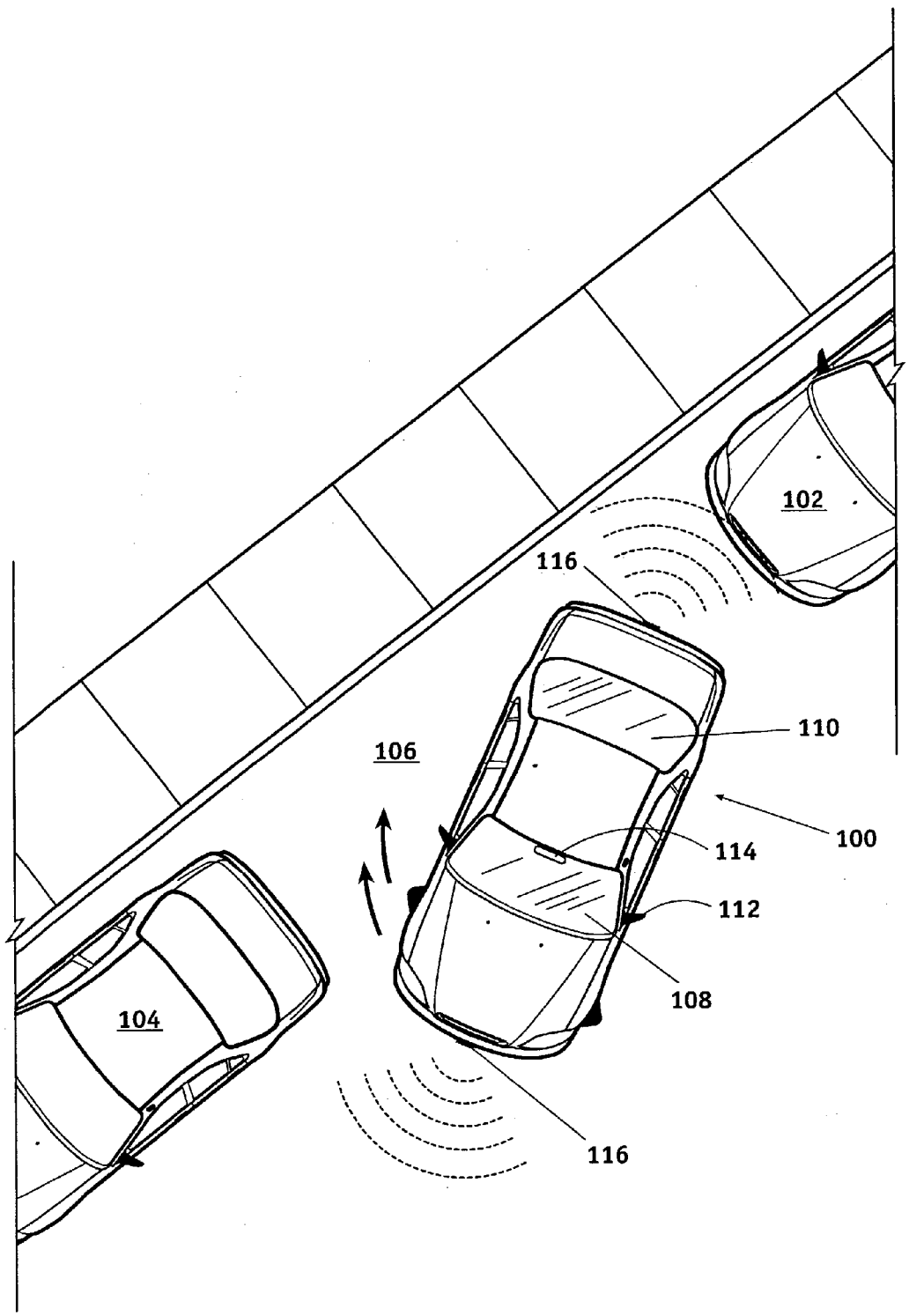
FIG. 1 illustrates a vehicle attempting to park between two other vehicles.

As stated previously, there are situations when a driver's visibility is limited or eliminated entirely, as for example when a driver is maneuvering a vehicle into a parking space on the side of a road between two other vehicles. This situation is illustrated in FIG. 1, which illustrates a vehicle 100 attempting to park between two other vehicles 102 and 104 parked along the side of the roadway. As is well known, in such situations a driver is often required to perform one or more iterations of backing up and pulling forward, each time exercising extreme caution so as to not hit the vehicle behind when backing up or the vehicle in front when pulling forward. To accomplish this maneuver, a driver generally uses a combination of looking out the front and rear windshields 108 and 110 respectively and looking through sideview mirror 112 and rearview mirror 114. Notwithstanding, very often a driver will, in fact, make contact with vehicle 102 and/or vehicle 104 possibly creating the need for expensive repairs.

In accordance with the present invention, distance measuring devices 116 are provided at the front and rear portions of vehicle 100. These sensors may employ ultrasonic, radar, or infrared emitters and receivers which transmit energy that bounces off an obstacle. That energy which is bounced or reflected is received back, and the distance is determined by measuring the time required for the energy to travel to and from the obstacle. That measurement is then processed and converted into a distance measurement in the well known manner. Such systems are well known, and the interested reader is referred to the above cited patents, the teachings of which are hereby incorporated by reference.

Figure 2:
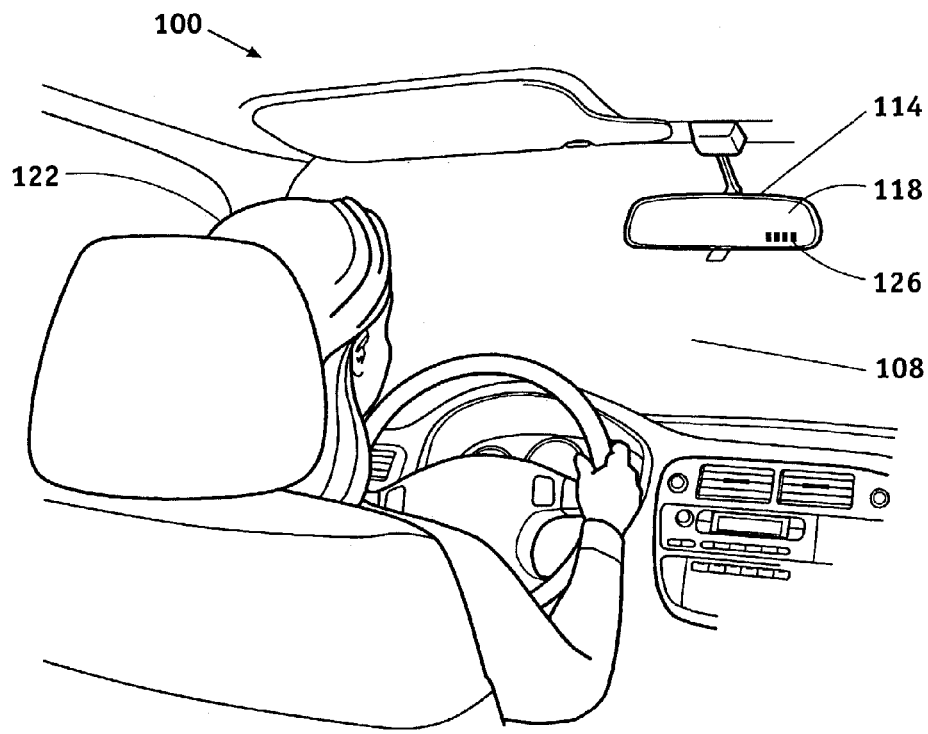
FIG. 2 illustrates a driver utilizing a rearview mirror.
Figure 3:
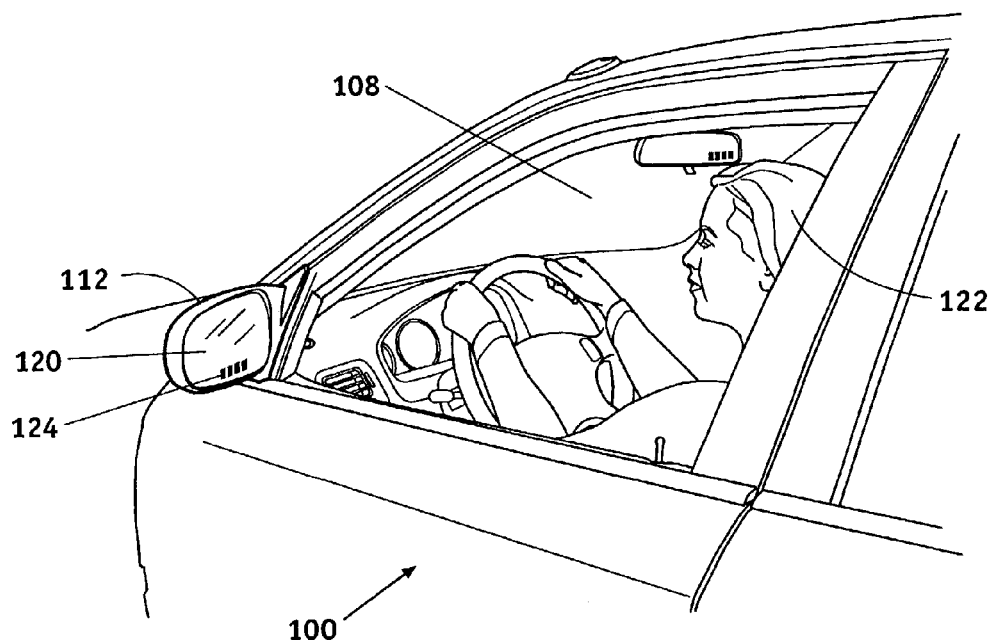
FIG. 3 illustrates a driver utilizing a sideview mirror.

The present invention comprises as distance measuring system wherein the distance between a vehicle and an obstacle in the front or to the rear of the vehicle is displayed in the vehicle's rearview mirror and/or sideview mirror. In this manner, a driver may easily determine the remaining distance between obstacles to the front and/or to the rear of the operator's vehicle. Referring to FIGS. 2 and 3, vehicle 100 is equipped with a rearview mirror 114 and sideview mirror 112. Each mirror includes a reflective surface 118 and 120 respectively which is easily viewed by driver 122. Each mirror 112 and 114 is provided with a display portion 124 and 126 respectively for displaying the distance between the vehicle and front and/or rear obstacles. Displays 124 and 126 also generate an indication of whether the distance being displayed is the distance to the front or to the rear of the vehicle.

Vehicular mirrors having integral displays are well known. For example, U.S. Pat. No. 5,631,638 issued May 20, 1997 and entitled, "Information System In A Motor Vehicle", describes an information system including circuits which are connected to the vehicle's computer, one or more sensors, and a display device. Circuits are accommodated in the frame of the rearview mirror, and the display system is integrated into the mirror glass. U.S. Pat. No. 5,064,709 issued Jun. 3, 1997 and entitled "Inner mirror of a Vehicle Having A Display Device" describes a vehicular mirror and integral display device including a mirror body, a rearview mirror, an information display section within the mirror area, a light emitting display section, and an information display mirror for reflecting the visual information displayed to a point visible by the driver. U.S. Pat. No. 6,099,154 issued Aug. 8, 2000 entitled "Mirror With Lighted Indicia" describes a vehicular mirror for displaying selectively lightable indicia. While the above described systems will not be described in detail, the interested reader is directed to the above cited patents, the teachings of which are hereby incorporated by reference.

Figure 4:
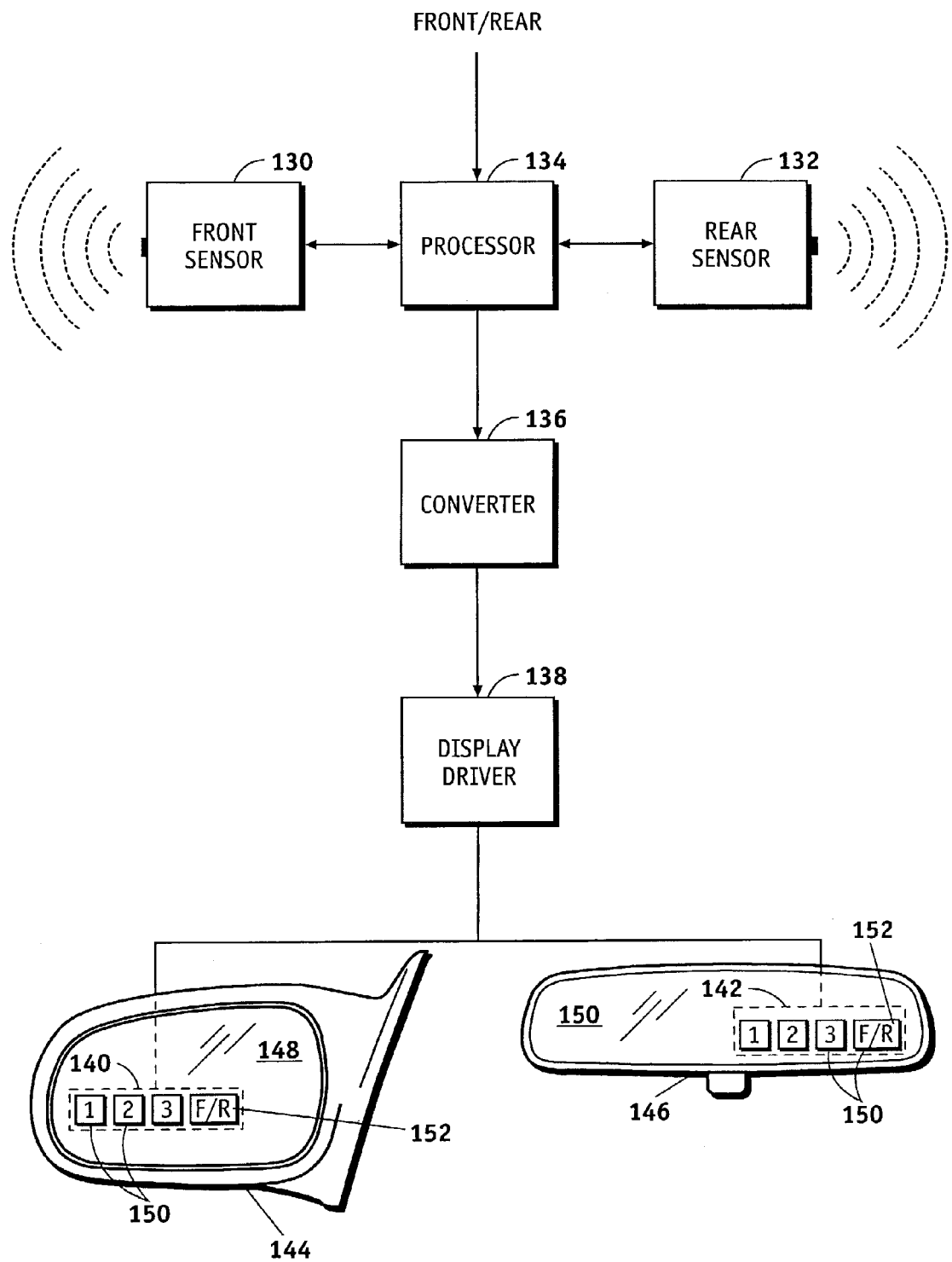
FIG. 4 is a block diagram of the inventive distance detection and display system.

FIG. 4 is a block diagram of the inventive distance measurement and display system. As above described, the system includes at least one front sensor 130 and at least one rear sensor 132. As stated previously, sensors 130 and 132 may be of the ultrasonic, radar or infrared types. Each of sensors 130 and 132 transmit energy and receive reflective energy.

Front sensor 130 and rear sensor 132 are coupled to processor 134 which controls transmissions from sensors 130 and 132 and processes reflected data received by sensors 130 and 132. In this manner, processor 134 calculates a distance measurement in the well known manner. Processor 134 also receives information as to whether the front distance or the rear distance should be displayed. To accomplish this, a front/rear signal is applied to processor 134 which may merely represent an indication of whether the vehicle is traveling forward or in reverse. A manual switch could also be provided to select whether the front or rear distance is displayed. If necessary, the measurement data generated by the process 134 may be converted in converter 136 into a form suitable for driving display driver 138. The output of display driver 138 is coupled to display devices 140 and 142 which are integral parts of sideview mirror 144 and rearview mirror 146. Displays 140 and 142 may be of any suitable type; e.g. light emitting diodes, liquid crystal displays, etc. Mirrors 144 and 146 are each provided with a reflective surface 148 and 150 respectively each having optically transmissive windows 150 therein. The distance measurement is displayed through these windows along with a display 152 indicating whether the displayed number represents the distance from an obstacle to the front portion of the vehicle or to the rear portion of the vehicle. Thus, the inventive distance detection and display system minimizes driver distractions by providing a display of the distance between an obstacle and the front or rear of the vehicle in the rearview mirror and/or sideview mirror.

Thus, there has been provided, in accordance with the invention, an improved vehicular distance measuring and display system. Although the invention has been described with reference to an illustrative embodiment, it is not intended that the invention be limited to this illustrative embodiment. Those with skill in the art will recognize that many variation and modifications exist that do not depart from the true spirit of the invention. For example, while the invention has been described with reference to a single front and rear sensor, multiple sensors may be employed. Accordingly, it is intended that all such variations and modifications be included as fall within the scope of the appended claims.

The invention claimed is:

1. A distance measuring and display system for use on a vehicle, said system comprising:
   at least one distance measuring sensor for measuring the distance between said vehicle and an obstacle in the vehicle's path; and
   a mirror assembly, comprising:
   a mirror having a reflective mirror surface;
   a display integrated within the mirror surface and coupled to said at least one distance measuring sensor for displaying the distance on said mirror assembly, wherein the display comprises an optically transmissive window disposed under the reflective mirror surface, wherein said optically transmissive window is covered by the reflective mirror surface.

2. A distance measuring and display system according to claim 1 wherein said display comprises light emitting diodes.

3. A distance measuring and display system according to claim 1, wherein said at least one sensor is an ultrasonic sensor.

4. A distance measuring and display system according to claim 1, wherein said at least one sensor is a infrared sensor.

5. A distance measuring and display system according to claim 1, wherein said at least one sensor is a radar sensor.

6. A distance measuring and display system according to claim 2 wherein said mirror assembly comprises at least one mirror covering substantially a viewing surface of the mirror assembly.

7. A distance measuring and display system according to claim 6 wherein said at least one mirror is a rearview mirror.

8. A distance measuring and display system according to claim 6 wherein said at least one mirror is a sideview mirror.

9. A distance measuring and display system according to claim 6 wherein said at least one mirror comprises a rearview mirror and a sideview mirror.

10. A distance measuring and display system according to claim 6 wherein said at least one sensor comprises at least one frontward directed sensor.

11. A distance measuring and display system according to claim 6 wherein said at least one sensor comprises at least one rearward directed sensor.

12. A distance measuring and display system according to claim 6 wherein said at least one sensor comprises:
   at least one frontward directed sensor; and
   at least one rearward directed sensor.

13. A distance measuring and display system according to claim 12 wherein said display includes indicia indicating whether a displayed distance is a front distance or a rear distance.

14. A distance measuring and display system for use on a vehicle having a mirror assembly thereon, said system comprising:
   at least one front distance measuring sensor for measuring the distance to an obstacle in front of the vehicle;
   at least one rear distance measuring sensor for measuring the distance to an obstacle to the rear of the vehicle; and
   a mirror assembly, comprising:
      a mirror having a reflective mirror surface;
      a display integrated within the mirror surface and coupled to said at least one front distance measuring sensor and to said at least one rear distance measuring sensor for displaying a distance and an indication of whether it is a front distance or a rear distance, wherein the display comprises an optically transmissive window disposed under the reflective mirror surface, wherein said optically transmissive window is covered by the reflective mirror surface.

15. A distance measuring and display system according to claim 14 wherein said display is an integral part of said mirror assembly.

16. A distance measuring and display system according to claim 15 wherein said mirror assembly comprises at least one mirror.

17. A distance measuring and display system according to claim 16 wherein said at least one mirror is a rearview mirror.

18. A distance measuring and display system according to claim 16 wherein said at least one mirror comprises a sideview mirror.

19. A distance measuring and display system according to claim 16 wherein said at least one mirror comprises a rearview mirror and a sideview mirror.

* * * * *